United States Patent [19]
Jaworske

[11] Patent Number: 5,912,777
[45] Date of Patent: Jun. 15, 1999

[54] HIGH TEMPERATURE SOLAR REFLECTOR, ITS PREPARATION AND USE

[75] Inventor: Donald A. Jaworske, Columbia Station, Ohio

[73] Assignee: The United States of America as represented by the Administrator of the National Aeronautics and Space Administration, Washington, D.C.

[21] Appl. No.: 08/903,195

[22] Filed: Jun. 26, 1997

[51] Int. Cl.⁶ .................................................. G02B 5/08
[52] U.S. Cl. .................... 359/883; 359/884; 359/589; 359/608
[58] Field of Search ................................ 359/883, 884, 359/589, 608

[56] References Cited

U.S. PATENT DOCUMENTS

| | | | |
|---|---|---|---|
| 3,869,198 | 3/1975 | Ballentine | 359/592 |
| 4,226,082 | 10/1980 | Nishida | 368/285 |
| 4,235,951 | 11/1980 | Swarovski | 428/40 |
| 4,261,863 | 4/1981 | Kent et al. | 252/463 |
| 4,497,700 | 2/1985 | Groth et al. | 204/192 P |
| 4,547,432 | 10/1985 | Pitts | 428/448 |
| 4,814,232 | 3/1989 | Bluege | 428/450 |
| 4,865,451 | 9/1989 | Ahonen et al. | 356/350 |
| 5,019,458 | 5/1991 | Eigat | 428/630 |
| 5,084,804 | 1/1992 | Schairer | 362/61 |

OTHER PUBLICATIONS

Jaworske, "Apparatus to Measure the Reflectivity of Silver and Rhodium Mirrors at Elevated Temperatures", vol. 1, pp. 47–49. Proceedings of 31st Intersociety Energy Conversion Conference, Aug. 11, 1996.

Jaworske, "Reflectivity of Silver and Silver–Coated Substrates from 25 Degrees to 800 Degrees C," 32nd Intersociety Energy Conversion Engineering Conference, Jul. 27, 1997. (Advance Copy for Examiner's Info Only) Not Yet Published.

Primary Examiner—Cassandra Spyrou
Assistant Examiner—Mohammad Y. Sikder
Attorney, Agent, or Firm—Kent N. Stone

[57] ABSTRACT

A coating-substrate combination having high specular reflectivity at high temperatures reaching 800° C. in a vacuum is described. The substrate comprises pure nickel metal or a nickel-containing metal alloy such as stainless steel having a highly polished reflective surface. The coating is a layer of silver deposited on the substrate to a thickness of 300 Å to 3000 Å. A 300 Å to 5000 Å protective coating of silica, alumina or magnesium fluoride is used to cover the silver and to protect it from oxidation. The combination is useful as a parabolic shaped secondary concentrator for collecting solar radiation for generating power or thermal energy for satellite uses. The reflective layer and protective coating preferably are applied to the reflective surface of the substrate by electron beam evaporation or by ion sputtering.

13 Claims, 1 Drawing Sheet

HIGH TEMPERATURE SOLAR REFLECTOR, ITS PREPARATION AND USE

ORIGIN OF THE INVENTION

The invention described herein was made by an employee of the United States Government and may be manufactured and used by or for the Government for Government purposes without the payment of any royalties thereon or therefor.

FIELD OF THE INVENTION

This invention relates to highly reflective surfaces capable of maintaining good specular reflectivity at elevated temperatures and in vacuum, suitable for terrestrial and space applications. More particularly, the invention relates to solar mirrors, particularly parabolic mirrors useful as secondary concentrators for use in thermal propulsion and power generator systems aboard satellites, shuttles and space stations.

BACKGROUND OF THE INVENTION

Much time and effort has been devoted to the study of solar radiation and to methods of capturing this inexhaustible source of solar energy to provide power for terrestrial and space applications. One technique for capturing and using this energy is to arrange a plurality of reflective panels, such as highly reflective aluminum or silver facets, into a large parabolic array to form a solar array concentrator. Large parabolic arrays of this type, several meters in diameter, are capable of achieving concentration ratios as high as 2000 to 1. The solar energy is focused on a heat receiver positioned in front of the array. This receiver transfers the energy to a dynamic system including a turbine and an alternator to generate electrical energy. Alternatively, it transfers the energy to a propulsion source such as cryogenic hydrogen to control the movement and the positioning of a satellite, shuttle or space station in orbit.

Higher solar flux concentration levels are obtainable by using a secondary concentrator upstage from the receiver. The secondary concentrator typically is in the shape of a compound curvature parabola in the form of a truncated cone having a ratio of inlet to outlet diameters between 2:1 to 4:1, thereby permitting increases in the flux concentration to 4000:1 or 8000:1.

The successful operation of the secondary concentrator is dependent on the use of such a parabola having a highly reflective surface, often in an environment where temperatures in the secondary concentrator can reach 500° C. or more, at a vacuum of $10^{-5}$ to $10^{-7}$ torr.

Heretofore, highly reflective surfaces have not been capable of withstanding these conditions. Silver has generally been recognized for its ability to provide a highly reflective surface. However, it tends to form oxide films at elevated temperatures thereby decreasing its specular reflectivity. Furthermore, a silver layer having a thickness greater than a few thousand angstroms tends to undergo crystal growth, resulting in an increase in diffuse reflectivity and a decrease in specular reflectivity. This results in a gradual undesirable scattering of the reflected solar rays.

Silver reflective coatings applied over polished copper substrates provide high specular reflectivity at lower temperatures. However, at the elevated temperatures encountered in solar flux concentrators, there is a tendency for the silver to migrate into the copper, thereby causing the reflective surface to become diffuse and ineffective.

Highly specular reflective surfaces can be produced by applying a silver layer over a single crystal sapphire substrate, and the reflectivity remains constant even at elevated temperatures encountered in a secondary concentrator. However, it is difficult to form a single crystal sapphire into the compound curvature of a parabola, and thus the composite has limited use.

U.S. Pat. No. 4,235,951 describes a reflector for solar energy, said reflector comprising a glass layer having, on one side, a support attached with an adhesive, and on the other side, a reflective layer. Silver and aluminum are noted as the preferred reflective material, at a thickness less than 1 micron (10,000 Å).

U.S. Pat. No. 4,547,432 discloses a method of making mirrors by attaching a silver layer to a glass surface using a chemical covalent bond between the silver and the glass. A protective layer of polymethylmethacrylate may be applied over the silver.

U.S. Pat. No. 5,019,458 describes a mirror for solar energy concentrators having high weather and abrasion resistance. The mirror comprises a glass substrate, a NiCr layer about 100 Å thick, a silver layer having a thickness of 700 to 1000 Å, a 100 Å layer of ZnS, an alumina layer of about 1 micron thickness and finally, a layer of silica having a thickness of 1000–1500 Å

SUMMARY OF THE INVENTION

It is an object of the present invention to provide a reflector composition capable of sustained functioning at high temperatures above 500° C. and at high vacuums;

Another object is a high temperature reflective layer which does not degrade at elevated temperatures and high vacuums;

Still another object of the invention is the use of a metal substrate that has high thermal conductivity, is compatible with the reflective layer, and can be formed into the contour shapes of a compound parabola;

Yet another object is a highly reflective composite that can be used as a compound parabola in a secondary concentrator for space applications.

These and other objects and advantages of the invention which will become readily apparent to those skilled in the art, are achieved in the manner to be more fully described hereinbelow.

The present invention relates to a method of making a solar reflector having a specular reflectivity of at least about 0.85 in the temperature range from room temperature to at least 500° C., and preferably to 700° or 800° C. The process comprises depositing a layer of silver to a thickness of about 300 Å to about 3000 Å onto a polished metal substrate selected from the group consisting of nickel and alloys of nickel. A pure nickel or an austenite stainless steel substrate is preferred. The surface of the substrate is polished to a mirror-like finish by a suitable process such as diamond turning or metallurgical polishing or a combination of diamond turning followed by metallurgical polishing. The silver layer is deposited on to the substrate by a suitable procedure such as electron beam evaporation or sputter deposition. The deposition is preceded by thoroughly cleaning the polished surface of the substrate such as by the sequential steps of washing with soap and water, water rinsing, washing with ethanol, rinsing with distilled water and blow drying with nitrogen gas. If the silver is deposited by sputter deposition, the nickel surface can further be cleaned prior to deposition by sputter cleaning. The silver layer is protected against oxidation by coating the layer with an inorganic material which is substantially transparent to solar rays. The inorganic material preferably is selected from the group consisting of silica ($SiO_2$), alumina ($Al_2O_3$), and magnesium fluoride ($MgF_2$). The protective coating is applied to a thickness of between about 300 Å to about 5000 Å by any suitable means. Typically, the same procedure used to apply the silver to the substrate may be used to apply the inorganic coating to the silver.

The invention further comprises a solar reflector having a specular reflectivity of at least about 0.85 in the temperature range from ambient to at least about 500° C., the reflector comprising a substrate made from a metal composed of nickel metal or alloys of nickel, said substrate having a polished surface, a layer of silver deposited on top of the polished surface of the substrate, and an oxidation resistant inorganic coating which is substantially transparent to solar rays. The substrate preferably is composed of nickel metal or a nickel-containing stainless steel, and the reflective surface of the substrate is polished by diamond turning, metallurgical polishing or the combination of diamond turning followed by metallurgical polishing. The silver layer typically has a thickness of between about 300 Å and 3000 Å, and the inorganic coating typically has a thickness between about 300 Å and about 5000 Å. The silver layer may be applied to the substrate by any suitable process, with electron beam evaporation and sputter deposition being preferred. In like manner, the protective coating is applied by any suitable means, preferably by the same process used to apply the silver. Inorganic materials which have been found to be suitable in the teachings of the present invention are silica, alumina and magnesium fluoride. Combinations of more than one of these materials is also possible, providing the transparency to solar rays is not compromised. The reflective surface is in the shape of a truncated conical parabola having the compound curvature of a secondary concentrator whereby the solar rays striking the surface are reflected toward the focal point of the parabola.

The invention also comprises a mirror capable of being used at temperatures of 500° C. and above in a vacuum, the mirror comprising in combination a metal substrate containing nickel and having a highly polished surface, a layer of silver coating the highly polished surface to a thickness of between about 300 Å and about 3000 Å, and a protective coating of an inorganic antioxidant material deposited over the silver to a thickness of between about 300 Å and 5000 Å. The substrate preferably consists of pure nickel metal or an austenite stainless steel. The inorganic coating preferably is selected from the group consisting of silica, alumina and magnesium fluoride, with silica being preferred. The substrate surface of the mirror is preferably polished by the procedure of diamond turning, metallurgical polishing or a combination of diamond turning followed by metallurgical polishing. The silver is then deposited on the polished metal substrate by a process such as electron beam evaporation or sputter deposition

DETAILED DESCRIPTION OF THE INVENTION

The present invention relates to a highly reflective surface for use in high temperature applications. More particularly,
it relates to a reflector having a high specular reflectivity at temperatures of 500° to 800° C. in the rarefied atmosphere encountered in orbital space uses. Yet more particularly, the invention pertains to a parabolic shaped secondary solar flux concentrator useful in a system that converts solar energy into power or into thermal propulsion.

Figure 1:
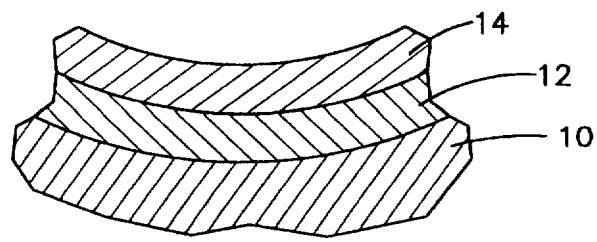
FIG. 1 is an enlarged partial cross sectional view of the composite reflector of the present invention.

Referring now to the drawings, FIG. 1 shows a cross-section of a portion of a secondary concentrator of the type used in the present invention. The concentrator comprises a suitable substrate 10, a layer 12 of silver thereover, and a protective coating 14 of an oxidation resistant inorganic coating that is transparent or substantially transparent to the solar radiation. The substrate has a thickness which is determined by factors such as the size of the secondary concentrator, the type and strength of the metal, the method of forming the substrate into shape and the ability to hold the shape within dimensional tolerances under the conditions of space applications. Pure nickel having a thickness of about 0.030 inches has been found to be very satisfactory for this purpose. It has the requisite strength, can be readily machined to the desired shape and can be polished to a mirror finish. Also suitable as a substrate are nickel alloys such austenitic stainless steel. Other alloys such as nickel-zinc and nickel-cobalt are candidates as well.

The silver layer 12 has a thickness between about 300 Å and about 3000 Å, preferably about 1000 Å. At these thicknesses, the silver coating is optically thick and conforms to the substrate, thus explaining the necessity for the substrate surface to be polished to a highly specular finish.

Oxidation of silver by oxygen can readily occur at the high temperatures encountered in use. On top of the silver layer is a protective layer to prevent the oxidative conversion of the silver to its diffuse or low-reflectivity oxide, and to protect against physical damage to the silver layer. The ideal protective coating is one which forms a strong bond with the silver, is transparent or substantially transparent to the solar rays, does not degrade under the high temperatures and thermal cycling of the secondary concentrator application and provides the requisite degree of protection to the silver. Certain inorganic oxides and halides have been found to be suited for this purpose including silica, alumina and magnesium fluoride. The thickness of the protective coating ranges from about 300 Å to 5000 Å with a thickness of about 1000 Å being preferred.

Figure 2:
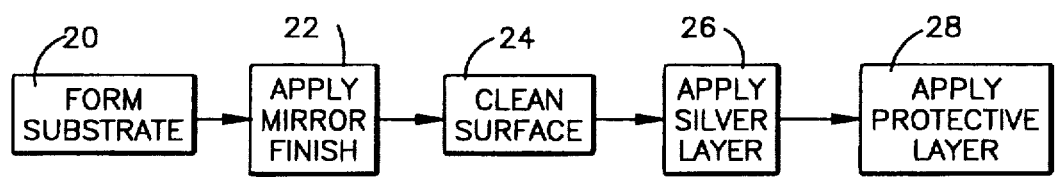
FIG. 2 is a flow chart showing the steps of fabricating a reflector of the present invention.

FIG. 2 is a flow diagram showing a typical sequence of steps for preparing the highly specular reflective surface of the present invention. The first step 20 of the process is the preparation of a parabolic surface having a compound surface curvature whereby incoming solar rays are reflected from a primary concentrator and are focused at the inlet of the parabola where they are reflected one or more times off of the parabolic surface before emerging from the outlet of the truncated parabola. Here they are used to power a self contained solar power system to drive a turbine or to heat propulsion gases, or perform other work consistent with the protocol mandated for the particular satellite, shuttle or space station to which the solar concentrator is assigned. For example, the concentrated solar flux can drive a turbo alternator/compressor to generate electrical energy for operation of on-board control and monitoring equipment, communication transmitters and test devices.

The preferred method of shaping the substrate metal is machining. However, other methods can be used such as casting or forging to form the substrate.

In the next step 22, the parabolic surface of the substrate is polished to a mirror finish by any of the known techniques such as diamond turning or metallurgical polishing or a combination of these two. Diamond turning is typically done using a commercially available constant or variable speed diamond lathe. Metallurgical polishing comprises polishing or buffing the surface with successively finer diamond grits. For nickel surfaces, metallurgical polishing is preferred to diamond turning.

Following polishing, the shaped and polished surface of the nickel or nickel-containing alloy is thoroughly cleaned. A series of steps including cleaning with soap and water; rinsing with tap water; cleaning with ethanol; rinsing with distilled water; and drying by blowing with nitrogen gas has been found to be satisfactory. As an alternative to the first three cleaning steps, the substrate can be cleaned in an ultrasonic bath followed by the distilled water rinse and drying in nitrogen gas.

In the next step 24, a thin layer of silver is applied to the polished compound curved surface of the substrate. Two methods which have been found to be useful for this purpose are sputter deposition and electron beam evaporation.

Sputter deposition can be achieved by use of commercially available equipment such as that manufactured and sold by Ion Tech, Fort Collins, Colo. including an MPS-3000 Power Supply and an IT-2500 Ion Source Control. The unit utilizes an ion gun to propel ions of argon gas against a silver target to dislodge silver atoms which deposit on the polished surface of the parabola as an amorphous layer until the requisite thickness is achieved. The sputter deposition can be preceded by bombarding the nickel surface with the argon ion beam to remove any residual contaminants from the polished surface of the substrate.

Electron beam evaporation can be carried out according to known methods in equipment such as Model EB-8 Electron Beam Power Supply sold by Eratron located in Campbell, Calif. This process involves directing electrons against silver in a graphite crucible or boat to cause the silver to evaporate and then condense on the target surface as a crystalline layer. The process is carried out under vacuum in a bell jar.

Following deposition of the silver, the next step 28 involves the application of the protective layer of silica, alumina or magnesium fluoride. If the silver is applied to the substrate by sputter deposition, the protective layer can be applied in the same manner. The sputter deposition equipment typically is provided with multiple turret target holders enabling the sequential application of multiple materials on a substrate without the necessity of breaking the vacuum and replacing one target with another.

Likewise, if the silver is deposited using electron beam evaporation, the equipment typically includes multiple crucibles, each adapted to contain a different material to be evaporated for deposition onto the substrate. Obviously, other methods can likewise be used to deposit the silver and the protective coating as well without departing from the scope of the invention.

It has been found that the application of a thin (e.g. 300–3000 Å) layer of silver on the polished surface of the substrate results in a microstructure comprising grains of silver having an average diameter of 24 microns or less. The resultant surface is highly specular. However, as the thickness of the silver layer increases, there is a corresponding increase in the grain size of the silver crystals to 50–65 microns, resulting in a higher degree of diffuse reflectivity and a decrease in specular reflectivity. This results in an overall decrease in the efficiency of the secondary concentrator.

Figure 3:
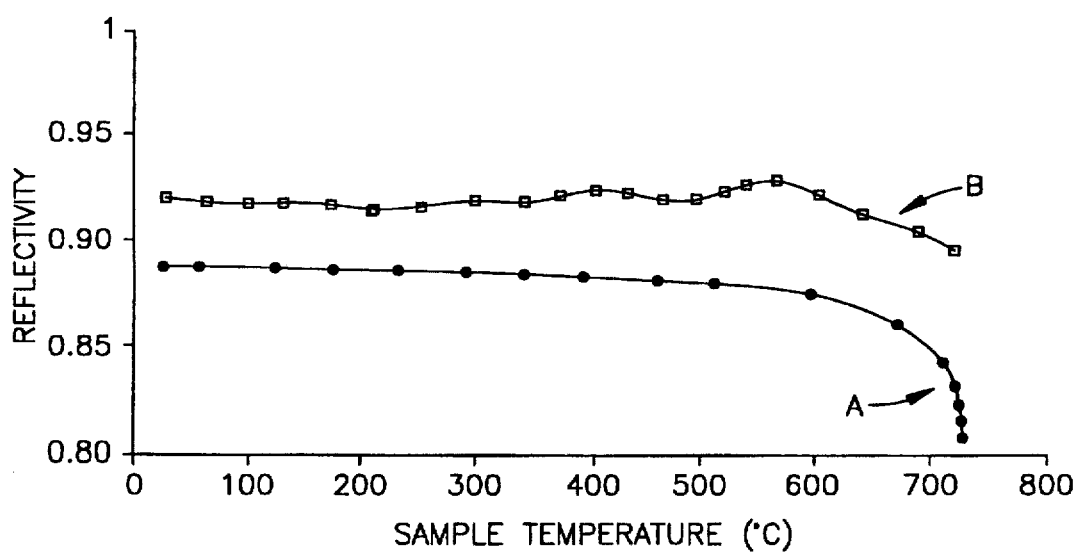
FIG. 3 is a graph showing specular reflectivity of silver on two separate substrates at temperatures from 25° C. to 700° C.

The specular reflectivity of the substrate-silver composites of the present invention are shown in FIG. 3. Herein are shown the specular reflectivity of silver on a pure nickel substrate (curve A) and silver on a Type 304 stainless steel substrate (curve B) at temperatures ranging from 25° C. to 800° C. The reflectivity is measured initially at room temperature in a Perkin-Elmer Lambda 9 spectrophotometer equipped with an integrating sphere and a light source to provide monochromatic light in the range of 250 to 2500 nanometers. The total, diffuse and specular reflectivity of the sample is measured at room temperature in this range. The substrate-silver composite is then transferred to a custom built vacuum chamber mounted on an optical bench where it is then heated using a graphite-boron nitride resistive heating element in a vacuum of $5 \times 10^{-6}$ torr. or better, and the reflectivity is obtained in the range of 100° to 800° C. using a helium-neon chopped laser beam at 632 nanometers. Half of the chopped beam is reflected off the sample and impinges on a silicon detector and the other half is routed to a reference detector. As is seen in FIG. 3, the silver samples show high specular reflectivity from room temperature to past 700° C. with minimal degradation.

EXAMPLE

A 1 cm. square pure nickel foil was polished to a mirror finish by metallurgical polishing, and was placed in the bell jar of an Eratron electron beam evaporator. A first crucible in the evaporator contained silver as a target, and a second crucible contained silica as a target. The pressure was reduced to $10^{-6}$ torr. The electron beam was maintained at a voltage of 9.81 kV and was directed at the silver target. At a current of 108 mA, the silver was evaporated and was deposited on the nickel foil at a rate of 9.0 Angstroms per second for a duration of 134 seconds to deposit the silver to a thickness of 1203 Å.

The second crucible was then moved into the target area and the electron beam was directed at the silica causing it to evaporate. The beam was operated at a voltage of 9.80 kV, and the current during evaporation was 111 mA. The silica was deposited on the surface of the nickel-silver substrate at a rate if 8 Å/second for 127 seconds to a thickness of 1009 Å.

The sample was tested for specular reflectivity in a Perkin-Elmer Lambda 9 spectrophotometer, and was found to have at least 85% specular reflectivity in the temperature range from 100° C. to 700° C.

In addition to its use as a secondary solar flux concentrator, the present invention can also find use in other applications such as optical sensors requiring high temperature reflective coatings. In addition, terrestrial solar furnaces may benefit from a highly reflective vacuum-compatible high-temperature substrate-coating system of the type herein described and claimed.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A solar reflector having a specular reflectivity of at least about 0.85 or greater in the temperature range from ambient to at least 500° C., the reflector comprising:

a) a substrate composed of a metal selected from the group consisting of nickel and alloy of nickel and having a polished reflector surface, b) a layer of silver deposited directly on top of the polished substrate surface to a thickness of between about 300 Å and about 3000 Å, wherein a specular reflectivity of said silver layer being at least about 0.85 or greater in the temperature range from ambient to at least 500° C. and c) an oxidation resistant inorganic coating that is substantially transparent to solar rays, and deposited directly upon said silver layer.

2. The reflector according to claim 1 wherein the substrate comprises pure nickel metal.

3. The reflector according to claim 1 wherein the substrate comprises austenite stainless steel.

4. The reflector according to claim 1 wherein the oxidation resistant inorganic coating is selected from the group consisting of silica, alumina and magnesium fluoride and covers the silver layer to a thickness of between about 300 Å and about 5000 Å.

5. The reflector according to claim 1 wherein the reflector surface is in the form of a truncated conical parabola.

6. The reflector according to claim 5 wherein the parabola is shaped with a compound curvature whereby solar rays striking the surface are reflected toward the focal point of the parabola.

7. A reflector mirror capable of being used at temperature of 500° C. and above in a vacuum comprising in combination:

a) a metal substrate containing nickel and having a highly polished surface, b) a layer of silver deposited directly on top of the highly polished surface, said layer having a thickness between about 300 Å and about 3000 Å, and providing a specular reflectivity above 500° C. of at least about 0.85; and c) a protective coating substantially transparent to solar rays and deposited directly upon said silver layer, said coating composed of an inorganic material having a thickness of between 300 Å and about 5000 Å and selected from the group consisting of silica, alumina and magnesium fluoride.

8. The reflective mirror according to claim 4 wherein the substrate comprises pure nickel metal.

9. The reflective mirror according to claim 4 wherein the substrate comprises austenite stainless steel.

10. The reflective mirror according to claim 4 wherein the protective coating is silica.

11. The reflective mirror according to claim 4 wherein the surface of the substrate is made highly reflective by a polishing procedure selected from the group consisting of diamond turning, metallurgical polishing, and diamond turning followed by metallurgical polishing.

12. The reflective mirror according to claim 4 wherein the layer of silver is deposited on to the polished metal substrate by a process selected from the group consisting essentially of electron beam evaporation and sputter deposition.

13. The reflective mirror according to claim 12 useful as a secondary concentrator for solar applications.

\* \* \* \* \*